Figure 1:
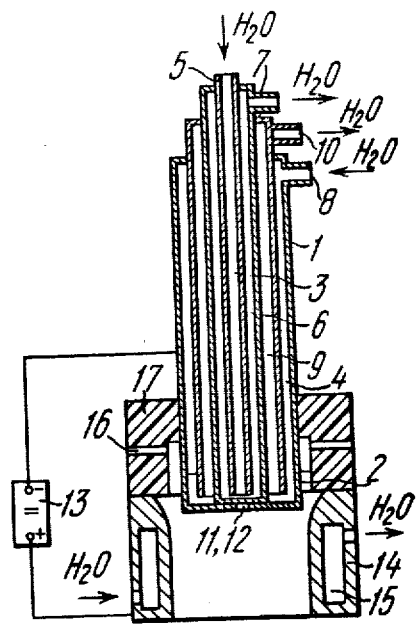

United States Patent [19]

Fridlyand et al.

[11] 4,304,980

[45] Dec. 8, 1981

[54] NON-CONSUMABLE ELECTRODE

[76] Inventors: Mikhail G. Fridlyand, ulitsa Pestelya, 11, kv. 139; Mikhail Z. Zhivov, prospekt Engelsa, 28, kv. 107; Nina A. Lebedinskaya, ulitsa Glinki, 3, kv. 64; Viktor M. Mokhov, ulitsa Vernosti, 38, korpus 1, kv. 94, all of Leningrad, U.S.S.R.

[21] Appl. No.: 55,742

[22] Filed: Jul. 9, 1979

[30] Foreign Application Priority Data

Jul. 11, 1978 [SU] U.S.S.R. .............................. 2630651
Feb. 14, 1979 [SU] U.S.S.R. .............................. 2718551

[51] Int. Cl.³ .............................................. B23K 9/00
[52] U.S. Cl. ........................... 219/121 PR; 219/75; 219/121 PN; 219/119; 219/120; 219/125.12
[58] Field of Search ............ 219/121 P, 121 PR, 118, 219/119, 121 PN, 120, 75, 74, 145; 313/231.4

[56] References Cited

U.S. PATENT DOCUMENTS

| 2,774,859 | 12/1956 | Johnson | 219/120 |
| 3,408,518 | 10/1968 | Strupczewski | 219/121 P X |
| 3,614,376 | 10/1971 | Manabe | 219/121 P |
| 3,944,778 | 3/1976 | Bykhovsky et al. | 219/121 PR |
| 4,059,743 | 11/1977 | Esibian | 219/121 P |
| 4,133,987 | 1/1979 | Lakomsky et al. | 219/121 P |

FOREIGN PATENT DOCUMENTS

1100211 1/1968 United Kingdom ............ 219/121 P

*Primary Examiner*—Arthur T. Grimley
*Assistant Examiner*—Mark Paschall
*Attorney, Agent, or Firm*—McAulay, Fields, Fisher, Goldstein & Nissen

[57] ABSTRACT

Disclosed is a non-consumable electrode for arc processes, comprising a housing made of a heat and electrically conductive material and having an interior to supply a cooling liquid thereinto, a yoke made of a heat and electrically conductive material, fixed on said housing and having an interior to supply a cooling liquid therein, an active insert rigidly fixed in said yoke and formed as a truncated cone whose minor base faces the portion whereon an electrode drop region of an electric arc rests and whose major base faces the cooling interior and has a recess therein shaped as a spherical segment.

3 Claims, 2 Drawing Figures

NON-CONSUMABLE ELECTRODE

FIELD OF THE INVENTION

The present invention relates to electrodes, and more particularly to non-consumable electrodes for arc processes.

The invention can be used most advantageously in ore melting and remelting, cutting and welding of metals, applying coatings.

BACKGROUND OF THE INVENTION

To provide stable and reliable operation of a non-consumable electrode, it is essential that certain requirements to its cooling should be satisfied.

First of all, maximum temperature in an active insert should not exceed the temperature of evaporation of its material. This condition should be met on the most thermally loaded surface of the active insert in the portion thereof whereon an electrode drop region of an electric arc rests.

Then, the temperature of a yoke should not exceed the melting point of its material since under conditions of high mechanical stresses caused by large temperature gradients arising during operation of an electrode the yoke should possess sufficient mechanical rigidity.

Besides, a heat flow density on the surface of the yoke interior cooled by the liquid, i.e. the amount of heat passing through the unit of this surface, should not exceed a critical value above which the cooling system does not provide sufficient heat removal, and stable and reliable operation of an electrode is upset.

Known in the prior art is a non-consumable electrode, chiefly a cathode, intended for operation in different plasma-forming mediums (see the U.S. Pat. No. 3,198,932).

This non-consumable electrode comprises a water cooled electrode holder with a copper yoke fixed therein and an active insert made as a rod of cylindrical shape and fixed in said yoke, for example, by means of soldering or pressing.

Such a shape of the active insert provides stable and reliable operation of a non-consumable electrode at an arc current up to 300 amperes above which an electrode is overheated beyond maximum limiting temperatures and, as a result, destroyed.

The operating life of a non-consumable electrode can be increased by enlarging the area of the cooled surface of the yoke interior.

Also known in the prior art is a non-consumable electrode (see the Author's Certificate of the U.S.S.R. No. 420,222) comprising a water cooled electrically conductive housing with a yoke fixed therein and made of a highly heat conductive material, and an active insert of a cylindric shape fixed in said yoke, the water cooled surface of said yoke being formed as a parabola.

A parabolic-shaped water cooled surface of a yoke improves the intensity of cooling thereof, as a result of which the rate of burning-out of the active insert is reduced and the working length and operating life of a non-consumable electrode are increased.

However, due to enlargement of the area of the yoke portions nearest to the surface of heat removal means and found to be in conditions close to critical ones as regards the heat flow density of a cooling liquid, reliability of operation of a non-consumable electrode is decreased.

The aforementioned non-consumable electrodes exhibit low thermal resistance, and they can be employed for air plasma-arc cutting at a current only up to 300 amperes.

To characterize thermal resistance of a non-consumable electrode, the authors used the value of a limiting heat flow, i.e. a total amount of heat supplied to the electrode, which the non-consumable electrode can withstand with repeated energizings without destruction.

Thermal resistance of a non-consumable electrode can be increased by enlarging the surface of contact between the active insert and the cooled yoke.

Known in the art is a cathode of a DC plasma arc torch (see the U.S. Pat. No. 3,408,518), comprising an electrode holder, a yoke fixed therein, both being made of heat and electrically conductive materials and having a common interior whereinto a cooling liquid is supplied, and, an active insert rigidly fixed in the yoke and formed as a truncated cone whose major base faces the cooling interior and has a recess shaped as a peaked cone facing with its peak the portion whereon the electrode drop region of an electric arc rests.

When an active insert shaped as a truncated cone is used, besides the enlargement of the surface area of its contact with the cooled yoke, an additional positive effect is simultaneously achieved consisting in that the portions of the water cooled surface of the yoke, most stressed in terms of the values of taken thermal loads, are shielded by the active insert flaring in the direction toward this surface, the material of said active insert always possessing low heat conduction as compared to the material of the yoke.

However, the increase in the linear dimensions of the active insert in radial direction as a result of cone flaring reduces the efficiency of cooling of the central portion of the active insert. To compensate for this effect, formed in the surface of the active insert, facing the cooling interior, is a recess of a cone shape with its peak facing the portion whereon the electrode drop region of an electric arc rests.

The recess in the surface of the insert, facing the cooling interior, provides reduction of the normal distance from the surface whereon the electrode drop region of an electric arc rests and which actually takes all the heat flow from the arc to the yoke, and simultaneous enlargement of the surface of contact between the active insert and the yoke.

It is well known to those skilled in the art that, with such a shape of the recess due to its acute peak, a region of high temperature gradients and considerable mechanical stresses caused thereby appear around this peak, which inevitably hastens destruction of the insert under operation particularly when it operates under conditions of intermittent energizings during plasma arc cutting, welding and similar processes.

SUMMARY OF THE INVENTION

It is an object of the present invention to provide a non-consumable electrode for arc processes, possessing a high thermal resistance.

Another object of the present invention is to provide a non-consumable electrode for arc processes, which provides its operation without exceeding maximum allowable temperatures for materials of the active insert and the yoke.

Another object of the present invention is to provide a non-consumable electrode for arc processes, wherein the region of concentration of temperature gradients and high mechanical stresses caused thereby is eliminated.

Still another object of the present invention is to provide a non-consumable electrode for arc processes, displaying a more uniform distribution of a heat flow over the cooled surface of the yoke interior and over the surface of the active insert, facing the cooling interior.

A further object of the present invention is to provide a non-consumable electrode for arc processes, featuring high reliability and stability.

A still further object of the present invention is to provide a non-consumable electrode for arc processes, possessing a long operating life at arc currents over 500 amperes.

With these and other objects in view there is provided a non-consumable electrode for arc processes, comprising a housing and a yoke fixed thereon, both being made of heat and electrically conductive materials and having a common interior to supply a cooling liquid thereinto, and an active insert rigidly fixed in the yoke and formed as a truncated cone whose major base faces the cooling interior and has a recess therein, wherein, according to the invention, said recess is shaped as a spherical segment.

The recess made as a spherical segment makes it possible to eliminate the region of concentration of temperature gradients and high mechanical stresses caused thereby which provides more uniform distribution of a heat flow over the cooled surface of the yoke interior and over the surface of the active insert, facing the cooling interior.

It is advisable to define the parameters of the spherical segment by the height of the cone forming the active insert and by the diameter of its minor base and to choose them according to the following relationships:

$$h/H = 0.3 \ldots 0.7; \quad D+2H > d > 0.8D,$$

where

H is the height of the active insert, h is the height of the spherical segment,

D is the diameter of the minor base of the active insert in the portion whereon an electrode drop region of an electric arc rests, and d is the diameter of the spherical segment base.

Said limits of relations between the dimension of the spherical segment and the dimensions of the active insert are chosen in accordance with the following considerations supported by experimental results.

With the height of the spherical segment smaller than 0.3 of the height of the active insert and with the diameter of the spherical segment base smaller than 0.8 of the diameter of the active insert in its portion whereon an electrode drop region of an electric are rests, the surface of contact between the highly heat conductive copper and the active insert is small, as a result of which the active insert is cooled rather ineffectively.

Consequently the surface of the active insert in its portion whereon an electrode drop region of an electric are rests, which is under most stressed conditions as regards the value of heat flow density, is overheated beyond the allowable temperature defined by the melting point of the active insert material (3,700° C. for graphite).

As a result, the material of the active insert (graphite) burns out, stable operation of a non-consumable electrode is disturbed, thermal load in the electrode grows and ultimately it is destroyed.

With the height of the spherical segment greater than 0.7 of the height of the active insert, the conditions of cooling of the active insert are fulfilled as regards maximum allowable temperatures. However, due to a large distance of the surface of contact of the spherical segment with the active insert from the cooling liquid and its vicinity to the high temperature portion whereon the electrode drop region of an electric arc rests, the temperature on this surface turns to be greater than the melting point of the yoke material (for copper it is equal to 1,083° C.). This results in reduction of mechanical regidity and failure of the electrode.

It is readily apparent that the upper limit to the diameter of the spherical segment base is restricted by the diameter of the active insert surface facing the cooling interior.

It has been experimentally found that the angle $\alpha$ at the base of the cone should be chosen in the range of 45 to 60 degrees. Consequently, with consideration for this fact, the maximum diameter d of the base of the spherical segment cannot exceed the value of $D+2H$.

Foregoing and other objects and advantages of the present invention will become more apparent upon consideration of the following detailed description of its embodiments taken in conjunction with the accompanying drawings in which:

BRIEF DESCRIPTION OF THE ACCOMPANYING DRAWINGS

Figure 2:
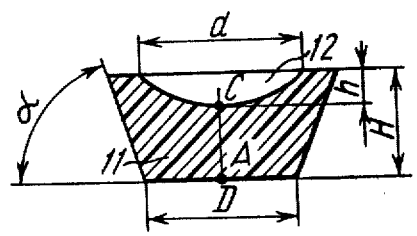

FIG. 1 schematically shows a longitudinal section of a non-consumable electrode, according to the invention; and FIG. 2 schematically shows an enlarged longitudinal section of an active insert, according to the invention.

A non-consumable electrode for arc processes comprises a water cooled housing 1 (FIG. 1) and a yoke 2 fixed thereon and made of heat and electrically conductive material, as a rule of ultrapure copper.

Provided for cooling of a non-consumable electrode inside the housing 1 and yoke 2 are a central interior 3 and a side interior 4 which are coaxial and non-communicating.

A cooling liquid is supplied into the central interior 3 through a branch pipe 5 and discharged therefrom through an interior 6 and a branch pipe 7.

A cooling liquid is supplied into the side interior 4 through a branch pipe 8 and discharged therefrom through an interior 9 and a branch pipe 10.

Rigidly fixed in the yoke 2 by means of pressing or soldering is an active insert 11 formed as a truncated cone whose major base faces the cooling interiors 3,6.

Made in the major base of the cone forming the active insert 11 (FIG. 2) is a recess 12 shaped as a spherical segment.

H, D are the height of the cone forming the active insert 11 and the diameter of its minor base, respectively.

h, d are the height and base diameter of the spherical segment forming the recess 12, respectively.

$\alpha$ is the angle at the base of the cone.

The negative pole of a power supply 13 is connected to the housing 1 and the positive one is connected to an anode 14 having an interior 15 for cooling thereof.

Passages 16 in a sleeve 17 made of heat and electrically insulating material are intended to supply a plasma-forming mixture into the space between electrodes (an arc gap).

The proposed electrode operates as follows.

To cool the housing 1 and yoke 2, water is supplied through the branch pipes 5 and 8 into the central and side interiors 3 and 4, respectively.

In so doing, the intensity of water supply into the central interior 3 is 2 to 3 times over the inensity of water supplied into the side interior 4.

Water is discharged from the central interior 3 through the interior 6 and branch pipe 7, and from the side interior 4 it is discharged through the interior 9 and branch pipe 10.

To cool the anode 14, a cooling liquid is supplied into the interior 15.

A plasma-forming gas mixture is supplied into the space between electrodes through the passages 16 in the sleeve 17. Upon switching on of the power supply 13, an electric arc is struck. Due to the recess 12 (shaped as a spherical segment) formed in the surface of the active insert 11 facing the cooling interior, conditions of cooling of the active insert are improved, and the electrode operates without burning-out thereof and without exceeding the melting point of the material of the water cooled yoke.

The authors have made investigations to study the influence of the parameters of the spherical segment on the character of distribution of maximum temperatures in a non-consumable electrode and their level.

Tabulated in Table 1 are the temperatures in the characteristic points of the active insert 11, obtained using a non-consumable electrode as a cathode of a DC arc burning at a current of 1,000 amperes in a plasma-forming mixture composed of natural gas and carbon dioxide, with a coefficient of heat transfer to cooling water equal to $2 \times 10^5 W/m^2$ deg.

To characterize the state of the cathode, two characteristic most thermally loaded points were used: a point "A" (FIG. 2) located in the centre of the operating surface of the active insert 11, whereon an electrode drop region of an electric arc rests, and a point "C" located in the summit of the spherical segment forming the recess 12.

The data shown in Table 1 were obtained for a cathode whose active insert has the following dimensions:

The height of the active insert $H = 3 \times 10^{-3}$ m, and the diameter of the minor base of the cone forming the active insert $D = 2 \times 10^{-3}$ m.

The parameters of the spherical segment are given in Table 1 in relative units.

continuous restoration from the plasma-forming mixture.

When a condition h <0.7H (Version 6) is not fulfilled, temperature in the point "C" is higher than the melting point of copper (1,083° C.), which results in mechanical destruction of the cathode.

When conditions h=(0.3 ... 0.7)H (Version 1 to 4) are fulfilled temperatures in the point "A" and in the point "C" do not exceed maximum allowable values for the materials of the active insert 11 and yoke 2.

Given below are the examples of tests of the proposed non-consumable electrode in different processes and under various conditions.

EXAMPLE 1

Used for plasma-arc welding in the mixture $CH_4 + CO_2$ was a non-consumable cathode shown in FIG. 1, but without the additional coaxial interior 9 for side cooling. Conditions of tests were as follows:

| Composition of the plasma-forming mixture: methane $CH_4$ and carbon dioxide $CO_2$. | |
|---|---|
| Current value | 500 A |
| Flow rate of gas mixture | 1,500l/hr |
| Flow rate of water in the central cooling interior | 200 g/sec. |
| Geometrical parameters: | |
| Height of the active insert | $3 \times 10^{-3}$m |
| Diameter of the minor base of the active insert | $2.2 \times 10^{31\ 3}$m |
| Diameter of the major base of the active insert | $5.2 \times 10^{-3}$m |
| Height of the spherical segment | $1 \times 10^{31\ 3}$m |
| Diameter of the base of the spherical segment | $2.0 \times 10^{-3}$m |

The results of the tests showed that the cathode exhibits stable operation without changes in the geometry of the active insert and at a constant value of a heat flow into the cathode equal to 1.2 kw.

EXAMPLE 2

Used to obtain a regenerating atmosphere $CH_4 + CO_2$ was a plasmatron with a non-consumable cathode whose construction is shown in FIG. 1 but without the additional coaxial interior 9 for side cooling. Conditions of tests were as follows:

| Composition of the plasma-forming mixture: natural gas and carbon dioxide. | |
|---|---|
| Current value | 800A |

TABLE 1

| Temperature in the characteristic points in °C. | Parameters of the spherical segment | Number of the version | | | | | | |
|---|---|---|---|---|---|---|---|---|
| | | 1 | 2 | 3 | 4 | 5 | 6 | 7 |
| | | h = 0.35H | h = 0.65H | h = .5H | h = 0.5H | h = 0.25H | h = 0.75H | h = 0.5H |
| | | d = 1.05D | d = 1.05D | d = 0.85D | d = 1.0D | d = 1.05D | d = 1.05D | d = 0.75D |
| $T_A$ | | 3,680 | 3,520 | 3,680 | 3,640 | 3,730 | 3,480 | 3,715 |
| $T_C$ | | 580 | 1,070 | 820 | 830 | 490 | 1,095 | 805 |

From the data of Table 1 it follows that, when conditions h>0.3H or d>0.8D (Versions 5,7) are not fulfilled, temperature in the point "A" is higher that the melting point of graphite (3,700° C.), which results in burning out of the active insert 11. This excludes operation of the cathode under most favourable conditions of

| Flow rate of gas mixture | 5,000l/hr |
|---|---|
| Flow rate of water in the central cooling interior | 300 g/sec |
| Geometrical parameters: | |
| Height of the active insert | $3 \times 10^{-3}$m |
| Diameter of the minor base of the active insert | $2.2 \times 10^{-3}$m |
| Diameter of the major base of the active insert | $5.2 \times 10^{-3}$m |

-continued

| Composition of the plasma-forming mixture: natural gas and carbon dioxide. | |
|---|---|
| Height of the spherical segment | $1.5 \times 10^{-3}$m |
| Diameter of the base of the spherical segment | $3.5 \times 10^{-3}$m |

The results of the tests showed that the cathode exhibits stable operation without changes in the geometry of the active insert and at a constant value of a heat flow into the cathode equal to 2.2 kW.

EXAMPLE 3

Used for plasma-arc cutting was a plasmatron with a non-consumable cathode whose construction is shown in FIG. 1 but without the additional coaxial interior 9 for side cooling of the cathode. Conditions of tests were as follows:

| Composition of the plasma-forming mixture: natural gas and air. | |
|---|---|
| Current value | 500A |
| Flow rate of gas mixture | 6,000l/hr |
| Flow rate of water in the central cooling interior | 450 g/sec |
| Geometrical parameters: | |
| Height of the active insert | $4 \times 10^{-3}$m |
| Diameter of the minor base of the active insert | $2.2 \times 10^{-3}$m |
| Diameter of the major base of the active insert | $6.5 \times 10^{-3}$m |
| Height of the spherical segment | $2.6 \times 10^{-3}$m |
| Diameter of the base of the spherical segment | $4.5 \times 10^{-3}$m |

The results of the tests showed that the cathode exhibits stable operation without changes in the geometry of the active insert and at a constant value of a heat flow into the cathode equal to 2.0 kw.

Thus, the recess formed in the surface of the active insert, shaped as a spherical segment and facing the cooling interior makes it possible, on the one hand, to improve conditions of cooling of the central portion of the active insert due to reduction of the distance between the operating surface of the insert and the water cooled yoke, and on the other hand, to provide more uniform distribution of temperature on the central water cooled surface of the yoke due to enlargement of the surface of its contact with the active insert.

Thus, the parameters of the spherical segment appreciably affect the character of distribution of temperatures in the active insert and water cooled yoke, as well as the values of maximum temperatures in these most thermally loaded elements of the electrode construction. By properly choosing the parameters of the spherical segment, it is possible to provide operation of an electrode without exceeding limiting temperatures both for the material of the active insert and for the material of the yoke.

The use of the invention enables an increase in thermal resistance of the non-consumable electrode and of its operating life at elevated thermal loads.

What is claimed is:

1. An active insert for use in a non-consumable electrode, said insert comprising a truncated cone having a planar minor base and a major base defining a planar peripheral annulus and a central depression, the ratio of the thickness of said insert at the central axis thereof to the depth of the depression at said central axis being:

$A = H(0.3-0.7); D+2H > d > 0.8D,$ wherein
A is the thickness of said insert at the axis thereof
H is the height of the cone
D is the diameter of the minor base of the cone, and
d is the diameter of the inner periphery of said annulus.

2. A non-consumable electrode for arc processes, comprising:
a housing made of a heat and electrically conductive material and having an interior for feeding a cooling liquid thereinto;
an active insert rigidly fixed to said housing and formed as a truncated cone whose major base is shaped as a spherical segment which has a first portion in face contact with an end face of said housing facing said interior and is shaped as a spherical segment; and
the parameters of said spherical segment are determined according to the following relationships:

$h = H(0.3 \text{ to } 0.7); D+2H > d > 0.8D,$ where
H is the height of the cone,
h is the Height of the spherical segment,
D is the diameter of the minor base of the cone, and
d is the diameter of the base of the spherical segment.

3. A non-consumable electrode according to claim 2, wherein
the shape of said active insert is a trapezoidally-shaped truncated cone with its smaller or minor base remote from said housing and the wall of said cone being angularly inclined with respect to said minor base at an angle between 45° to 60°, and
the maximum diameter of said major base is less than $D + 2H$ with a portion of said major base lying in a plane parallel to a plane of said minor base.

* * * * *